(12) United States Patent
Davidian et al.

(10) Patent No.: US 9,657,987 B2
(45) Date of Patent: May 23, 2017

(54) INTEGRATED METHOD AND APPARATUS FOR COMPRESSING AIR AND PRODUCING CARBON DIOXIDE-RICH FLUID

(75) Inventors: Benoit Davidian, Saint Maur des Fosses (FR); Jean-Pierre Tranier, L'Hay-les-Roses (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 884 days.

(21) Appl. No.: 13/993,353

(22) PCT Filed: Nov. 4, 2011

(86) PCT No.: PCT/FR2011/052573
§ 371 (c)(1),
(2), (4) Date: Jun. 12, 2013

(87) PCT Pub. No.: WO2012/080601
PCT Pub. Date: Jun. 21, 2012

(65) Prior Publication Data
US 2013/0255310 A1    Oct. 3, 2013

(30) Foreign Application Priority Data

Dec. 15, 2010 (FR) ...................... 10 60574

(51) Int. Cl.
*F25J 3/06* (2006.01)
*F01K 13/00* (2006.01)
*F25J 3/04* (2006.01)
*F28C 3/08* (2006.01)

(52) U.S. Cl.
CPC .............. *F25J 3/067* (2013.01); *F01K 13/00* (2013.01); *F25J 3/04018* (2013.01);
(Continued)

(58) Field of Classification Search
CPC ...... F25J 3/04533; F25J 3/067; F25J 3/04636; F25J 3/04018; F25J 3/04545;
(Continued)

(56) References Cited

U.S. PATENT DOCUMENTS 5,233,837 A * 8/1993 Callahan .............. B01D 53/229
60/648
5,724,805 A * 3/1998 Golomb ................ F01K 23/106
60/39.12

(Continued)

FOREIGN PATENT DOCUMENTS

| CN | 101 063 406 | 10/2007 |
|---|---|---|
| DE | 19539774 A1 | 4/1997 |
| DE | 10330859 A1 | 2/2004 |
| EP | 1039115 A2 | 9/2000 |
| EP | 1132594 A1 | 9/2001 |
| FR | 2878294 A1 | 5/2006 |
| FR | 2946099 A1 | 12/2010 |

OTHER PUBLICATIONS

FR2946099 Translation.*
PCT/FR2011/052573, International Search Report, Jan. 31, 2012.
FR1060574; Search Report and Written Opinion; Aug. 8, 2011.

*Primary Examiner* — Frantz Jules
*Assistant Examiner* — Brian King
(74) *Attorney, Agent, or Firm* — Justin K. Murray

(57) ABSTRACT

An apparatus for compressing air and producing a carbon dioxide-rich fluid includes an air compressor, an element for bringing the air bound for the air compressor into contact with water to produce humidified air and cooled water, a pipe for sending the humidified compressed air from the air compressor to an installation producing a carbon dioxide-rich gas, a carbon dioxide-rich gas compressor for compressing the carbon dioxide-rich gas, at least one heat exchanger upstream and/or downstream the carbon dioxide-rich gas compressor and pipes for conveying into the heat exchanger water cooled in the contact element and the carbon dioxide-rich gas.

16 Claims, 3 Drawing Sheets

(52) U.S. Cl.
CPC ....... *F25J 3/04533* (2013.01); *F25J 3/04545* (2013.01); *F25J 3/04551* (2013.01); *F25J 3/04575* (2013.01); *F25J 3/04612* (2013.01); *F28C 3/08* (2013.01); *F25J 2205/32* (2013.01); *F25J 2230/02* (2013.01); *F25J 2230/80* (2013.01); *F25J 2235/80* (2013.01); *F25J 2260/58* (2013.01); *F25J 2260/80* (2013.01); *Y02E 20/326* (2013.01)

(58) Field of Classification Search
CPC .. F25J 3/04575; F25J 3/04612; F25J 3/04551; F25J 2205/32; F25J 2230/80; F01K 13/00
See application file for complete search history.

(56) References Cited

U.S. PATENT DOCUMENTS

| | | | |
|---|---|---|---|
| 6,148,602 A | 11/2000 | Demetri | |
| 6,293,086 B1* | 9/2001 | Reynolds | F02C 3/30 60/39.5 |
| 6,389,799 B1 | 5/2002 | Hatamiya et al. | |
| 6,442,951 B1* | 9/2002 | Maeda | F24F 3/1423 62/271 |
| 7,637,093 B2* | 12/2009 | Rao | F01K 11/02 60/39.52 |
| 2003/0131582 A1 | 7/2003 | Anderson et al. | |

\* cited by examiner

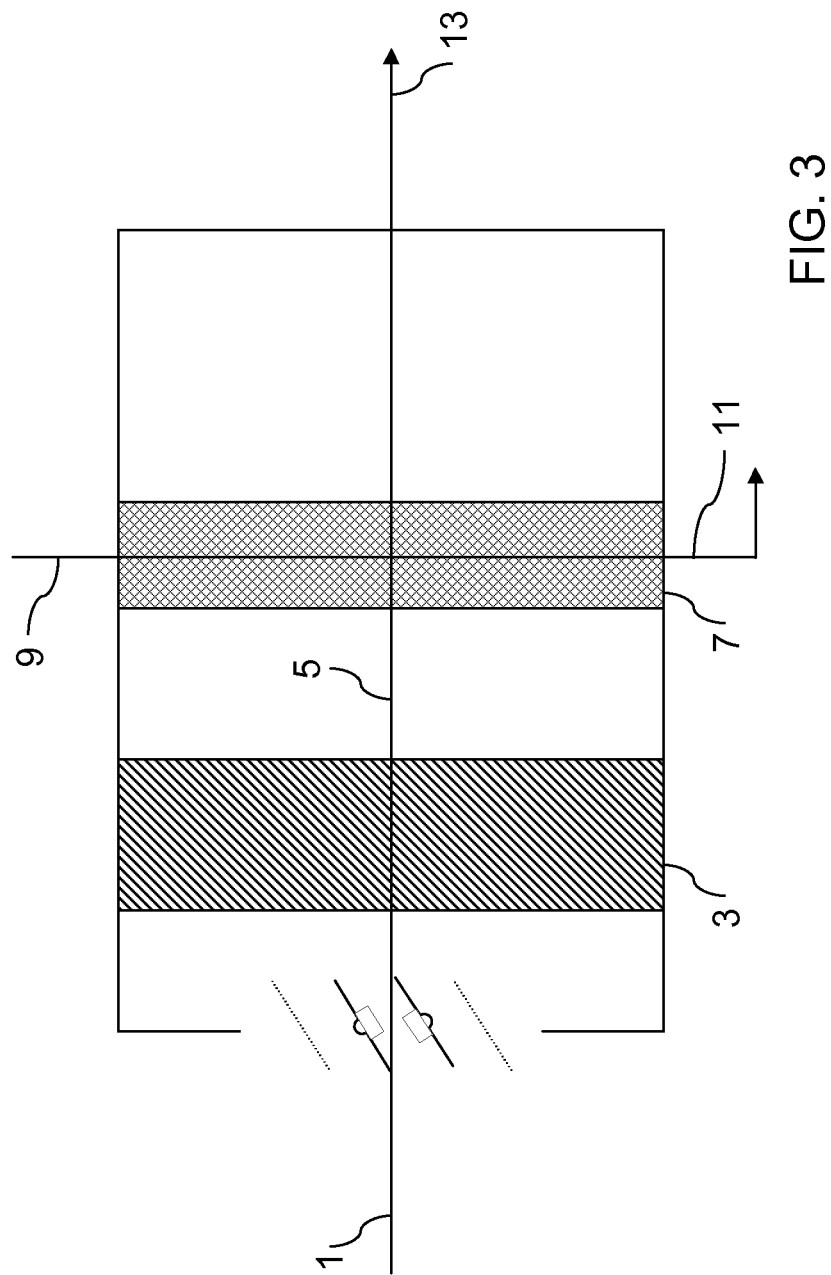

US 9,657,987 B2

INTEGRATED METHOD AND APPARATUS FOR COMPRESSING AIR AND PRODUCING CARBON DIOXIDE-RICH FLUID

CROSS REFERENCE TO RELATED APPLICATIONS

This application is a §371 of International PCT Application PCT/FR2011/052573, filed Nov. 4, 2011, which claims the benefit of FR1060574 filed Dec. 15, 2010, both of which are herein incorporated by reference in their entireties.

TECHNICAL FIELD OF THE INVENTION

The present invention relates to an integrated process and to an integrated apparatus for compressing, and even separating, air and for producing a carbon dioxide-rich fluid.

BACKGROUND

A carbon dioxide-rich fluid contains at least 30 mol % of carbon dioxide or at least 60 mol % of carbon dioxide or even at least at least 80 mol % of carbon dioxide, or even at least 95 mol % of carbon dioxide.

In order to reduce the $CO_2$ emissions of human origin to the atmosphere, methods have been developed for capturing the $CO_2$ generated in a given process. They involve extracting the $CO_2$ from a gas generated by the process, optionally purifying it, and lastly, in general, compressing it for its transportation within a pipeline system.

It should be stated at this point that another route for transporting the $CO_2$ is to liquefy it and load it onto boats designed for such use. Some $CO_2$ liquefaction cycles entail the compression of the $CO_2$ to a pressure such that it can be condensed to a temperature close to ambient. The liquid is subsequently depressurized to the transport pressure (typically between 6 and 10 bar a). The invention will then be applicable to this type of factory.

It should also be stated that despite major differences between the $CO_2$ capture methods (post-combustion, mention may be made of washing with amines or with aqueous ammonia; there is also gasification of the fuel, chemical loop processes, ferrous metallurgical processes, cement plants, or any industrial process that uses air), they virtually all include compression of the relatively pure $CO_2$, and are therefore suitable for implementing the invention described hereinafter.

The pressures at which the $CO_2$ is supplied to the pipeline systems are generally greater than 150 bar abs. In the state of the art, the $CO_2$ is compressed to the final pressure in a centrifuge compressor (given the flow rates in question in the applications of $CO_2$ capture in factories).

SUMMARY OF THE INVENTION

One aspect of the invention is based on the fact that around 60 bar, $CO_2$ can be condensed to a temperature close to ambient. Once it is in a condensed form (the density is multiplied by a factor of 3 to 500), pumping the $CO_2$ consumes much less energy than compressing the same amount in the gaseous form.

In the text below, the term "compression" will denote the means of raising the pressure of a gas and the term "pumping" will denote the means of raising the pressure of a fluid possessing a density of greater than 500 kg/m³, which is the lower limit of density that is acceptable for pumps.

Furthermore, the terms "$CO_2$-rich flow" and "$CO_2$" will be used similarly.

It should be stated that, with a given composition, the pressure to which a gas must be compressed in order to condense it at a given temperature increases with the temperature. Similarly, with a given temperature, the condensation pressure increases with the level of uncondensable species (elements more volatile than $CO_2$, as for example CO, $H_2$, $O_2$, $N_2$, Ar, and NO).

One aspect of the invention involves cooling the $CO_2$-rich fluid emerging from an industrial process, for example, in order to condense part of the water it contains, so as to reduce the energy for compressing the $CO_2$. One optional aspect of the invention therefore involves reducing the operating costs by fulfilling the compression with a pump, after having condensed the $CO_2$-rich flow.

Recycling the cold water used for cooling the $CO_2$-rich fluid allows the process to operate autonomously and to consume no water.

According to one subject of the invention, an integrated process for compressing air and producing a carbon dioxide-rich fluid is provided, comprising the steps of:

i) contacting air for an air compressor with water to produce humidified, or even water-saturated, air and cooled water, ii) compressing the humidified air in the compressor to produce compressed air, iii) using at least part of the compressed air or a fluid produced by separating the compressed air in a plant producing a carbon dioxide-rich gas, iv) compressing the carbon dioxide-rich gas in a carbon dioxide compressor, and v) cooling the carbon dioxide-rich gas upstream and/or downstream of the carbon dioxide compressor with frigories from the cooled water of step i).

According to other optional aspects:

the air from the air compressor is cooled to condense water present in the air, and the water present in the air is used to humidify the air for the air compressor.

a residual gas containing carbon dioxide from the plant is cooled to condense water that it contains; the water is used to cool the air for the air compressor; and the residual gas is treated to produce the carbon dioxide-rich gas.

the carbon dioxide-rich gas is cooled downstream of the carbon dioxide compressor so as to condense it, and the carbon dioxide-rich liquid produced is pressurized in a pump.

an oxygen-enriched stream or a nitrogen-enriched stream or an argon-enriched stream is the fluid produced by separating the air.

the plant is an oxy-fuel combustion plant or a ferrous metals production plant or a gasifier.

compressed air is used in the plant.

the plant is a cement plant, a plant for producing metals, for example a ferrous metals plant, or a gas turbine.

According to another aspect of the invention, an integrated apparatus is provided for compressing air and producing a carbon dioxide-rich fluid, comprising an air compressor, an element for contacting the air for the air compressor with water to produce humidified, or even water-saturated, air and cooled water, a line for sending the compressed humidified air from the air compressor to a plant producing a carbon dioxide-rich gas or a line for sending a fluid produced by separating the compressed air to the plant, a carbon dioxide-rich gas compressor for compressing the carbon dioxide-rich gas, at least one heat exchanger upstream and/or downstream of the carbon dioxide-rich gas compressor, and lines for sending water cooled in the contacting element and the carbon dioxide-rich gas to the heat exchanger.

The contacting element may be integrated with an air filtration element in a single box.

The apparatus may comprise a cooler for cooling the air from the air compressor for condensing water present in the air, and a line for conveying the water present in the air for humidifying the air for the air compressor.

The apparatus may further comprise a cooler for cooling a residual gas containing carbon dioxide from the plant, for condensing water that it contains, and a line for sending the condensed water for cooling the air for the air compressor. The apparatus may comprise means for treating the water-deprived residual gas for producing the carbon dioxide-rich gas.

The exchanger may be downstream of the carbon dioxide compressor for cooling the carbon dioxide-rich gas, so as to condense it, and a pump for pressurizing the carbon dioxide-rich liquid produced.

The apparatus may comprise an air separation unit for producing an oxygen-enriched stream or a nitrogen-enriched stream or an argon-enriched stream by separating the air from the compressor, after drying.

The plant may be an oxy-fuel combustion plant or a ferrous metals production plant or a gasifier.

The plant may comprise a line for sending the compressed air the plant.

The plant may be a cement plant, a plant for producing metals, for example a ferrous metals plant, or a gas turbine.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

FIG. 3 illustrates elements 3 and 7 from FIGS. 1 and 2.

DETAILED DESCRIPTION

Figure 1:
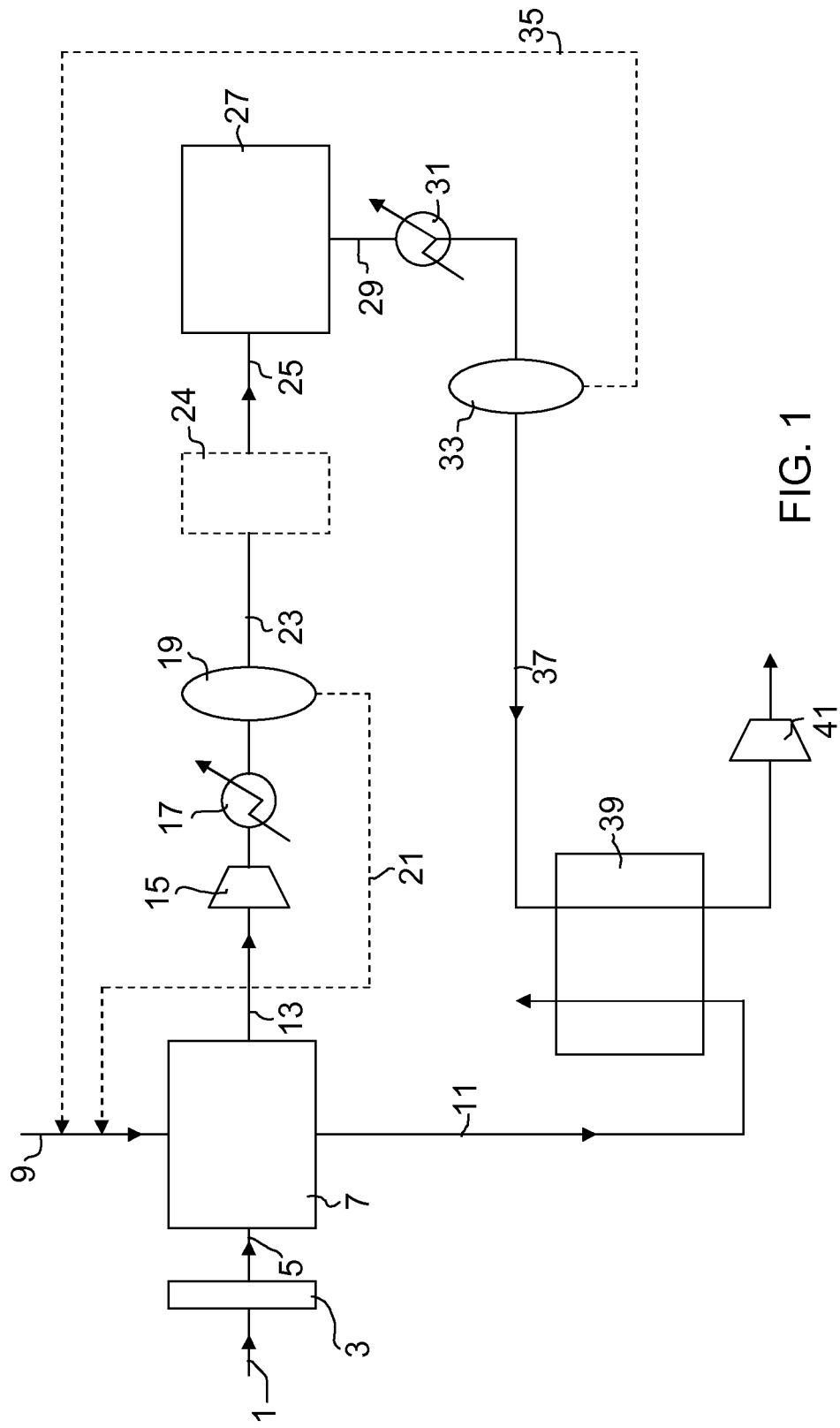
FIG. 1 represents an apparatus in accordance with an embodiment of the invention.
Figure 2:
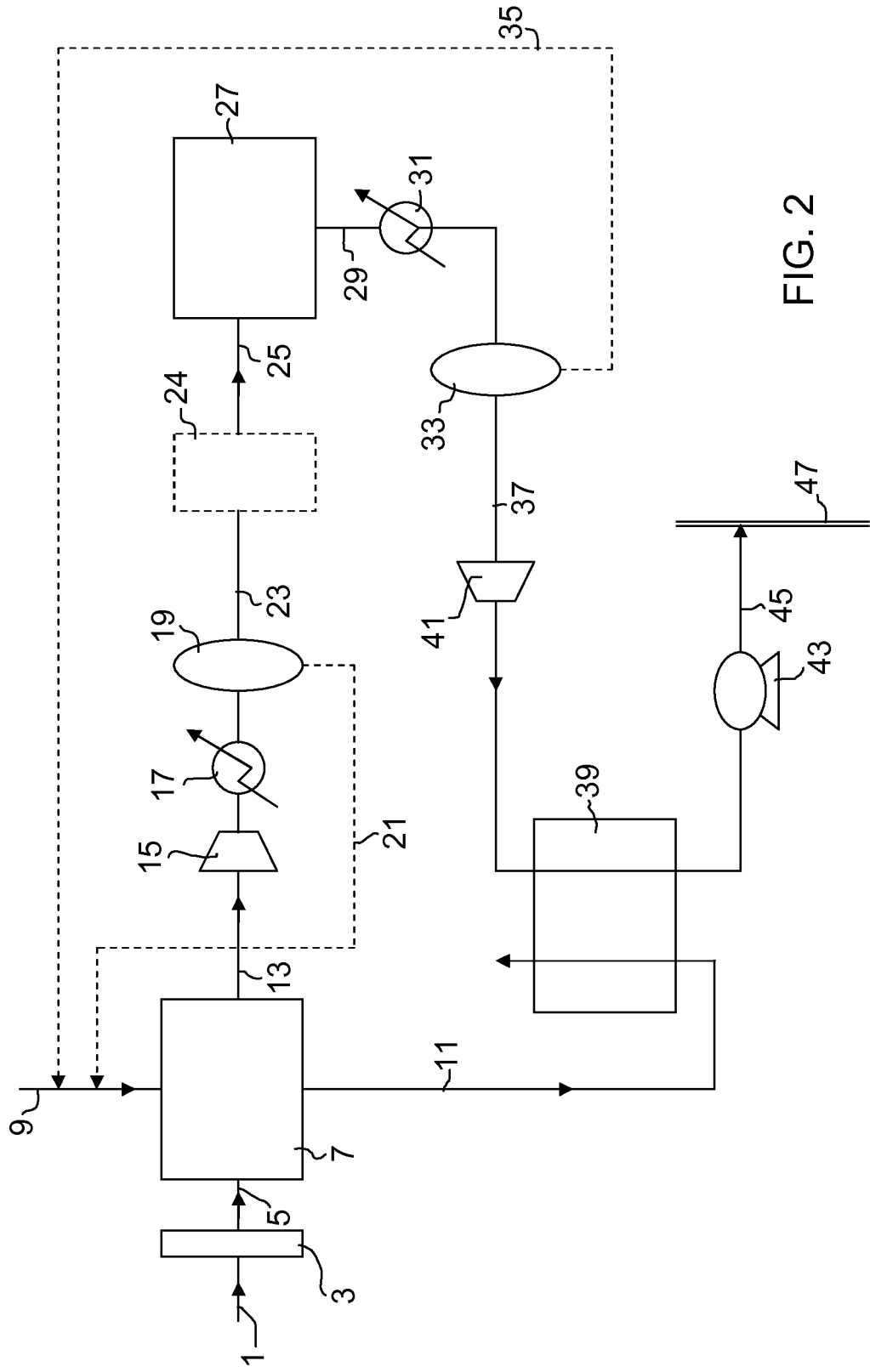
FIG. 2 represents an apparatus in accordance with an embodiment of the invention.

Certain embodiments of the invention will be described in more detail with reference to the figures, where FIGS. 1 and 2 illustrate an integrated process according to the invention and FIG. 3 illustrates the elements 3 and 7 from the preceding figures.

FIG. 1 shows an integrated process comprising an apparatus for compressing air and an apparatus for producing a carbon dioxide-rich gas.

A stream of air is cleaned in a filter 3, and the filtered air 5 is sent to an element 7 for exchange of heat and material between the filtered air 5 and water 9, the water 9 being at a lower temperature than the air 5. Following the exchange of heat and material, the filtered air 5 is enriched in water, optionally to saturation point, and is optionally heated to form humid stream 13. The cooled water in the element 7 constitutes the water stream 11. The humid stream 13 is compressed in the compressor 15 to a pressure of between 3 and 15 bar abs. It is subsequently cooled in a cooler 17, the effect of which is to condense at least part of the water present in humid stream 13. The water separates from the air in a phase separator 19, to form the stream 21, which is at least partly recycled to the stream 9. Accordingly, the water added to the air 5 to form the humid stream 13 may be recycled substantially completely to the element 7, such that the process is able to operate without, or with virtually no, supply of water. The dried air 23 from the phase separator 19 may be sent directly to a unit 27 as stream 25 to feed a process operated by the unit or to be used to cool part of the unit. The unit 27 may in this case be a cement plant, a gas turbine, or a plant for producing metals—for example, steel or iron. Alternatively, the dried air 23 may be sent to an air separation unit 24, operating for example by cryogenic distillation, to produce an oxygen- or nitrogen- or argon-enriched stream 25. This stream 25 feeds the unit 27, which may be a gasification unit, a combustion unit, a unit for producing electricity by combustion, if the stream is enriched in oxygen, or a unit for producing metals, for the three enrichment possibilities.

In all of the cases, the unit 27 produces a stream 29 containing at least 30% of carbon dioxide, or even at least 70% of carbon dioxide. At least part of the remainder of the stream 29 may be hydrogen, nitrogen, or carbon monoxide, for example. The stream 29 also contains at least 10% of water. This water is removed by cooling the stream 29 with the cooler 31 and by leaving the water to condense in the phase separator 33. The condensed water 35 is optionally recycled to the stream 9.

The stream 37, containing at least 30% of carbon dioxide, is cooled in an indirect heat exchanger 39 against at least water 11 from the element 7, which has not been cooled outside of the element 7.

The cooled stream 37 is sent to the compressor 41 and compressed to a pressure of preferably from 55 to 65 bar abs.

The compressed stream may then be cleaned in a low-temperature distillation unit, or otherwise treated.

FIG. 2 differs from FIG. 1 in that the compression of the stream in the compressor 41 takes place upstream of the exchanger 39. The cooled stream 37 undergoes liquefaction in the exchanger 39 or cools if it is already at a supercritical pressure, and is subsequently pressurized by the pump 43 to a higher pressure, to form the pressurized liquid 45. This liquid stream 45 may be sent to a pipeline system 47, solidified, or otherwise treated. If it is sent to a pipeline system, the exit pressure from the pump 43 may be more than 150 bar abs, and the gas 37 is compressed upstream by the compressor to an intermediate pressure. Consideration might also be given to purifying the stream 37, for example, in a low-temperature distillation unit, for enriching it in $CO_2$, between the phase separator 33 and the compressor 41.

FIG. 3 shows in greater detail the elements 3 and 7 from the preceding figures.

A common box contains a filtration element 3 and a contacting element 7. The air 1 is filtered in the filtration element 3 and then humidified by contact with the water 7. The water 11 exiting the element 7 is cooled, and the humidified air 13 is treated in the remainder of the process. The contacting element 7 may be composed of a packing body allowing exchange of material and heat between the water and the air.

The stream 11 is recycled to the stream 9 if the process does not consume water. It may, for example, be sent to a cooling system, of cooling-tower type, for example, before being sent to the element 7. The fluids 21 and/or 35 may, furthermore, be mixed with the stream 11 prior to this pre-cooling.

In all of the cases, it is possible for not only the air compressed in the compressor 15 but also a fluid produced by separating the remainder of the air compressed in the compressor to both be sent to the same plant 27.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. An integrated process for compressing air and producing a carbon dioxide-rich fluid, comprising the steps of:
   i) contacting an air stream with water to produce a humid air stream and a cooled water stream;
   ii) compressing the humid air stream in an air compressor to produce a compressed air stream;
   iii) using at least part of the compressed air stream, or a fluid produced by separating the compressed air stream in an air separation unit, in a plant that is configured to produce a residual gas containing carbon dioxide;
   iv) cooling the residual gas to condense water within the residual gas and then removing the condensed water from the residual gas to produce a carbon dioxide-rich gas;
   v) compressing the carbon dioxide-rich gas in a carbon dioxide compressor, and
   vi) cooling the carbon dioxide-rich gas downstream of the carbon dioxide compressor using the cooled water stream of step i) in a heat exchanger to produce the carbon dioxide-rich fluid, wherein the carbon dioxide-rich fluid is a liquid or a supercritical fluid.

2. The process as claimed in claim 1, wherein the humid air stream from the air compressor is cooled to condense water present in the humid air stream, and the water present in the humid air stream is recycled back for use in step i).

3. The process as claimed in claim 1, wherein the fluid produced by separating the compressed air stream in the air separation unit is selected from the group consisting of an oxygen-enriched stream, a nitrogen-enriched stream, an argon-enriched stream, and combinations thereof.

4. The process as claimed in claim 3, wherein the plant is selected from the group consisting of an oxy-fuel combustion plant, a ferrous metals production plant, and a gasifier.

5. The process as claimed in claim 1, wherein the plant of step iii) uses the compressed air stream to produce the residual gas containing carbon dioxide.

6. The process as claimed in claim 5, wherein the plant is selected from the group consisting of a cement plant, a plant for producing metals, and a gas turbine.

7. An apparatus for compressing air and producing a carbon dioxide-rich fluid, the apparatus comprising:
   an element configured to contact an air stream with water to produce a humidified air stream and a cooled water stream;
   an air compressor configured to receive the humidified air stream from the element and compress the humidified air stream to a higher pressure to form a compressed humidified air stream;
   a plant configured to receive the compressed humidified air stream or a stream derived therefrom to produce a carbon dioxide-rich gas;
   a carbon dioxide compressor configured to compress the carbon dioxide-rich gas;
   a heat exchanger downstream of the carbon dioxide compressor, wherein the heat exchanger is in fluid communication with the carbon dioxide compressor and the element, such that the heat exchanger is configured to receive the carbon dioxide-rich gas from the carbon dioxide compressor and receive the cooled water from the element, wherein the heat exchanger is configured to exchange heat between the cooled water and the carbon dioxide-rich gas such that the carbon dioxide-rich gas is cooled within the heat exchanger to produce a carbon dioxide-rich fluid, wherein the carbon dioxide-rich fluid is a liquid or a supercritical fluid.

8. The apparatus as claimed in claim 7, wherein the contacting element is integrated with an air filtration element in a single box.

9. The apparatus as claimed in claim 7, further comprising a cooler and a phase separator disposed downstream the air compressor and upstream the plant, wherein the cooler is configured to receive the humidified air stream from the air compressor and sufficiently cool the humidified air stream such that at least a portion of the water contained within the humidified air stream is condensed, wherein the phase separator is configured to remove the condensed water from the humidified air stream, wherein the phase separator is in fluid communication with the element such that the element is configured to receive the condensed water from the phase separator for use in humidifying the air stream.

10. The apparatus as claimed in claim 7, further comprising a cooler for cooling a residual gas containing carbon dioxide from the plant, for condensing water contained within the residual gas, and a line configured to send the condensed water to the element for use in humidifying the air stream.

11. The apparatus as claimed in claim 7, further comprising an air separation unit for producing an oxygen-enriched stream or a nitrogen-enriched stream or an argon-enriched stream by separating the air from the compressor, after drying.

12. The apparatus as claimed in claim 7, wherein the plant is an oxy-fuel combustion plant or a ferrous metals production plant or a gasifier.

13. The process as claimed in claim 1, further comprising the step of pumping the carbon dioxide-rich fluid in a pump.

14. The process as claimed in claim 1, wherein all of the carbon dioxide-rich gas is condensed during step vi) such that the carbon dioxide-rich fluid consists of a liquid when exiting the heat exchanger.

15. The process as claimed in claim 1, wherein the carbon dioxide-rich fluid produced during step vi) has the same or greater concentration of carbon dioxide as compared to the carbon dioxide-rich gas produced during step iv).

16. The process as claimed in claim 1, wherein the carbon dioxide-rich gas is compressed to a pressure of between 55 and 65 bar during step v).

\* \* \* \* \*